June 6, 1944.    R. SCHARFNAGEL    2,350,829
MOLTEN GLASS EXTRUDING APPARATUS
Filed June 14, 1940
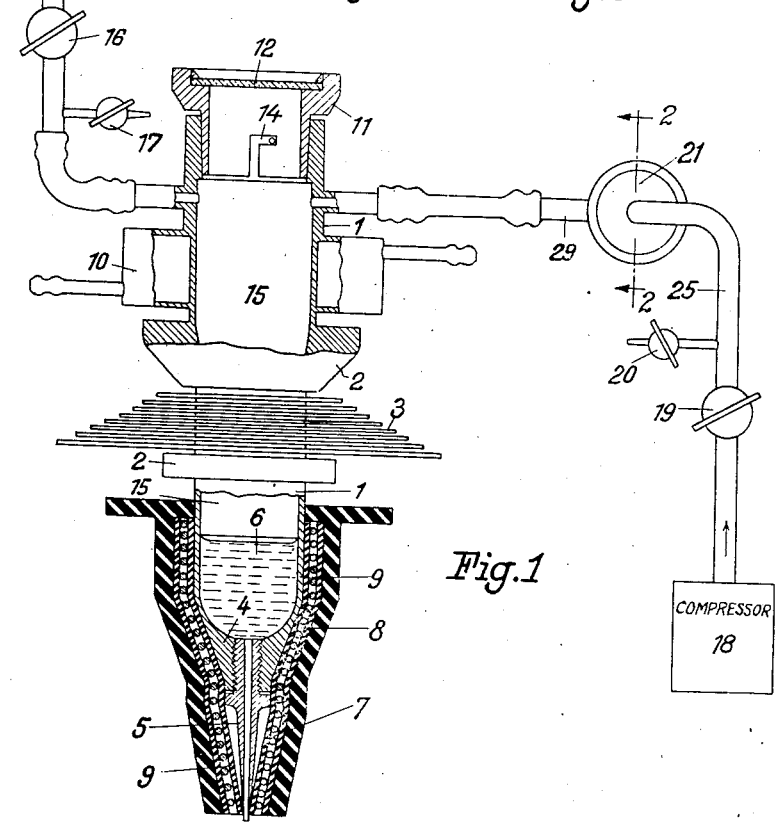
Inventor:
Rudolf Scharfnagel
by R.C. Hoggood Patented June 6, 1944

2,350,829

UNITED STATES PATENT OFFICE 2,350,829

MOLTEN GLASS EXTRUDING APPARATUS

Rudolf Scharfnagel, Stuttgart, Germany; vested in the Alien Property Custodian

Application June 14, 1940, Serial No. 340,441
In Germany May 25, 1939

1 Claim. (Cl. 49—55)

As is well known the casing or envelope of electric discharge vessels may be composed of two parts sealed, welded or soldered together, thus insuring the necessary vacuum tightness, or a cover may be arranged which softens when heated. However, the heat employed to such end is able to affect the electrode system and also constitutes an undesirable expenditure of energy. Such a cover may comprise an insulating body and a glass disc fixed to this by melting.

The invention described hereafter does not require the insulating body or cover, which may also serve to support the electrode system and preferably is of a ceramic material, to be united with any glass body intended to act as sealing material. In fact, the invention provides for applying a sealing glass to both the insulating body and the bulb of the discharge vessel, the bulb preferably having a metallic flange for this purpose.

In this way the invention makes possible the use of sealing glass that may be of any desired degree of softness. It does away with all the drawbacks due to low melting sealing glass and yet insures that all the advantages thereof are obtained. For instance, metal parts to which the sealing glass is applied need not be heated to temperatures at which the electrode system is affected. Thus cooling means for the electrode system need not be provided. These advantages exist especially if the metal parts consist of an alloy of iron and at least 15% chromium. If in addition the sealing glass has the property of dissolving the oxides of this alloy, then the metal part has to be heated to a temperature not higher than about 40% of the temperature usually necessary for the provision of glass seals. Accordingly, the cost of manufacture is considerably reduced and the time taken by the manufacture of a discharge vessel can be rendered so short as to make possible a rate of mass production difficult to surpass.

According to the invention a flow of vitreous material is directed against the joint or spot to be sealed, as will be understood from the following description, reference being had to the accompanying drawing, in which Fig. 1 is a partially diagrammatic elevation, with parts in section showing one form of apparatus for effecting the invention, Fig. 2 is a sectional detail view on line 2—2 of Fig. 1, and Fig. 3 represents a section on line 3—3 of Fig. 2.

In the arrangement diagrammatically shown in Fig. 1 the vitreous sealing material is held in melted condition in a reservoir having a nozzle outlet for application purposes, as will later be clear. Since, in the form shown, the nozzle outlet is directed downwardly, it is necessary to provide a vacuum to prevent undesired spilling of vitreous material. At the same time, for purposes that will readily become apparent, pressure and control means are also provided for quickly ejecting the vitreous sealing material in spurts, or otherwise as desired.

In a preferred form a type of melting crucible 1 is equipped with heat accumulating enlarged portions 2 and cooling ribs 3. The bottom part 4 of the crucible carries a squirting nozzle 5. This nozzle and the lower part of the crucible are located within an electric heating coil 7 which is provided with an insulating jacket 8. 6 denotes the vitreous material contained in the crucible and liquefied therein by the heat produced by coil 7. In case the parts 1, 4, 5 are of metal they are covered by layers of asbestos 9, whereby coil 7 is prevented from short-circuiting. The upper part of the crucible is fitted with a cylindrical cooling vessel 10 arranged to be traversed by water. The cooling so effected enables the upper opening of the crucible to be closed by means of a greased plug 11 which may be somewhat conical, as shown, forming the upper end wall of the crucible and secured in the crucible side wall by a bayonet joint 14. The plug 11 is hollow and has an inspection window 12 hermetically fastened therein. Through this window the behaviour of the sealing material 6 may be observed.

The space 15 above the vitreous material 6 may be connected either with a vacuum pump 32 or with a compressor 18. In order to render the above mentioned pressurized spurt control more effective, check or bleeder means may be interposed between the vacuum generating means 32 and the reservoir chamber 15. In the preferred form shown this means includes an adjustable bleeder or check valve 16 and adjustable valve means 17 for bleeding in air from the atmosphere. An additional vacuum reservoir 33 serves to render the vacuum more lasting and less subject to destruction with successive injections of pressurized air as will be clear.

The pressure in space 15 is adjustable with the aid of a cock 19 and a valve 20, this being intended for fine regulation. The air from compressor 18 enters the space 15 through a conduit 25, a control valve 21 and a conduit 29.

Valve 21 is constructed as shown in Figs. 2 and 3. 22 denotes a stationary disc provided with bores 23 which are arranged in circular relation to each other. The bores 23 communicate with a chamber 24 to which the conduit 25 is connected. A disc 26, fitted with bores 27, is hermetically seated in the disc 22. The bores 27 communicate with a chamber 28 to which the conduit 29 is joined. On the side remote from chamber 24 the discs 22, 26 are flush with each other, and the flush surfaces thereof are polished. A control disc 30, having a U-shaped channel 31, is arranged to contact with these surfaces and to rotate on them. Channel 31 serves to interconnect the bores 23, 27 in such a manner that the compressor 18 is periodically connected with the space 15. The air pressure which thus enters the crucible 1 acts to force the liquefied material 6 through the nozzle 5 during predetermined intervals of time. The duration of these depends on the speed with which the disc 30 is rotated by a suitable drive 30'. The flow of vitreous material thus ejected is directed against the joint or spot, not shown, to be covered therewith. To such end the device is preferably so positioned that the nozzle 5 is located above such joint and by preference vertically relative thereto.

In a preferred form the nozzle 5 is removable to permit the insertion in its stead of nozzles of other shapes. In the case represented it is screwed into the bottom part 4 of the crucible.

The opening of the nozzle 5 is so calculated that the material 6 when in its viscous state cannot leave the nozzle whereas when the material 6 is in its liquid state it will be able to leave it by drops. By suitably calculating the opening and shape of nozzle 5, the pressure in space 15, the viscosity of the material 6 and the distance between nozzle 5 and the joint or spot to be sealed, the material 6 will leave the nozzle with a speed sufficient to make it adhere firmly to the joint against which it is ejected.

The composition of the material 6 should be such that this is easy to liquefy and quickly solidifies when impinging upon the joint to be sealed.

Instead of inserting the finished material 6 into the crucible the component substances thereof may be arranged in the crucible in order to be heated by the coil 7 and thereby to produce the vitreous material.

What is claimed is:

Apparatus for extruding a stream of molten glass, comprising a closed crucible having an aperture at the bottom thereof, a nozzle joined to said crucible and in communication therewith through said aperture, heating means surrounding the lower portion of said crucible and said nozzle and substantially co-extensive with said nozzle, a transparent viewing means included in an upper wall of said crucible for permitting visual observation of the contents of said crucible, heat accumulating means between said heating means and viewing means and comprising a relatively large mass of heat conducting material affixed to said crucible and in heat-conducting relation thereto, heat radiating means affixed to said crucible, adjacent said heat accumulating means and means for controllably exerting fluid pressure within said crucible for squirting predetermined amounts of molten glass from said nozzle.

RUDOLF SCHARFNAGEL.